United States Patent
Lammerink et al.

(10) Patent No.: US 8,881,601 B2
(45) Date of Patent: Nov. 11, 2014

(54) FLOW METER AND USE THEREOF FOR DETERMINING A FLOW OF A MEDIUM, AS WELL AS A METHOD THEREFOR

(75) Inventors: Theodorus Simon Josef Lammerink, Enschede (NL); Joost Conrad Lötters, Ruurlo (NL); Marcel Dijkstra, Enschede (NL); Jeroen Haneveld, Lochem (NL); Remco John Wiegerink, Hengelo (NL)

(73) Assignee: Berkin B.V., Ruurlo (NL)

( * ) Notice: Subject to any disclaimer, the term of this patent is extended or adjusted under 35 U.S.C. 154(b) by 200 days.

(21) Appl. No.: 13/487,465

(22) Filed: Jun. 4, 2012

(65) Prior Publication Data

US 2012/0304731 A1  Dec. 6, 2012

(30) Foreign Application Priority Data

Jun. 3, 2011   (NL) ..................................... 2006895

(51) Int. Cl.
| | | |
|---|---|---|
| *G01F 1/36* | (2006.01) | |
| *G01F 25/00* | (2006.01) | |
| *G01F 1/684* | (2006.01) | |
| *G01F 1/84* | (2006.01) | |

(52) U.S. Cl.
CPC ............ *G01F 25/003* (2013.01); *G01F 1/6845* (2013.01); *G01F 1/8445* (2013.01)
USPC .................................................... 73/861.01

(58) Field of Classification Search
USPC .......................... 73/861.355–861.357, 861.02
See application file for complete search history.

(56) References Cited

U.S. PATENT DOCUMENTS

| | | | | |
|---|---|---|---|---|
| 4,768,384 | A * | 9/1988 | Flecken et al. ............. | 73/861.02 |
| 7,040,181 | B2 * | 5/2006 | Rieder et al. ............. | 73/861.357 |
| 7,353,718 | B2 * | 4/2008 | Mehendale et al. ...... | 73/861.355 |
| 7,437,949 | B2 * | 10/2008 | Nakao et al. ............. | 73/861.355 |
| 7,549,346 | B2 * | 6/2009 | Yoshida ..................... | 73/861.28 |
| 7,628,084 | B2 * | 12/2009 | Schlosser et al. ........ | 73/861.355 |
| 7,845,242 | B2 * | 12/2010 | McAnally et al. ........ | 73/861.355 |
| 8,621,937 | B2 * | 1/2014 | Henry ....................... | 73/861.354 |
| 2002/0073774 | A1 | 6/2002 | Kohno | |
| 2003/0233860 | A1 | 12/2003 | Deane et al. | |
| 2010/0080262 | A1 | 4/2010 | McDonald | |
| 2011/0113896 | A1* | 5/2011 | Drahm et al. ............. | 73/861.357 |

FOREIGN PATENT DOCUMENTS

| | | |
|---|---|---|
| DE | 102005046319 A1 | 3/2007 |
| EP | 0717270 A2 | 6/1996 |
| EP | 0774649 A1 | 5/1997 |

(Continued)

OTHER PUBLICATIONS

Dutch Search Report, dated Feb. 9, 2012, from corresponding Dutch application No. NL2006895.

*Primary Examiner* — Jewel V Thompson
(74) *Attorney, Agent, or Firm* — Tyler J. Sisk; Casimir Jones S.C.

(57) ABSTRACT

The invention relates to a flow meter for determining a flow of a medium. The flow meter comprises a flow tube for transporting the medium whose flow is to be measured. The flow tube has a supply end and a discharge end disposed downstream thereof. The flow meter is provided with a first flow sensor for measuring the flow of the medium at a first position of the flow tube. The flow meter is provided with a second flow sensor for measuring the flow of the medium at a second position of the flow tube.

28 Claims, 10 Drawing Sheets

(56) References Cited

FOREIGN PATENT DOCUMENTS

| EP | 0943900 | A1 | 9/1999 |
|----|---------|----|--------|
| EP | 1387150 | A2 | 2/2004 |
| EP | 1411355 | A1 | 4/2004 |
| EP | 2078936 | A1 | 7/2009 |

* cited by examiner

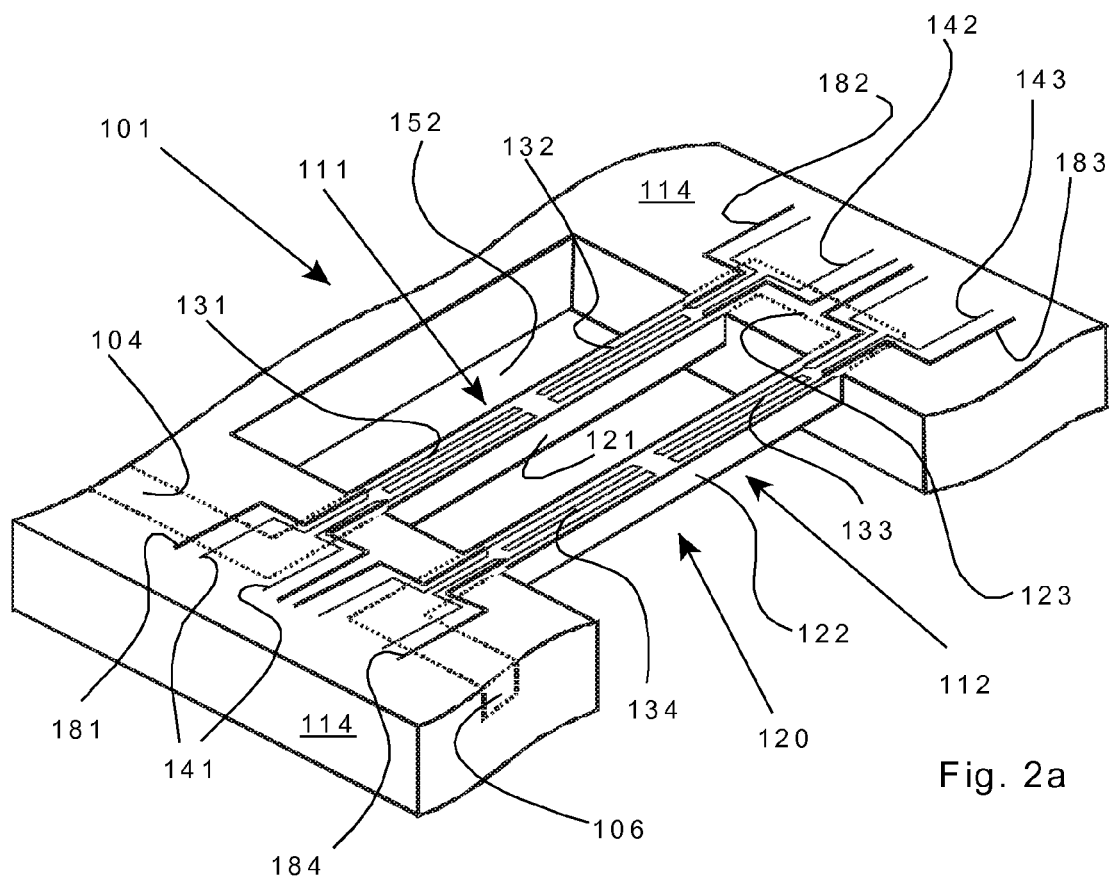
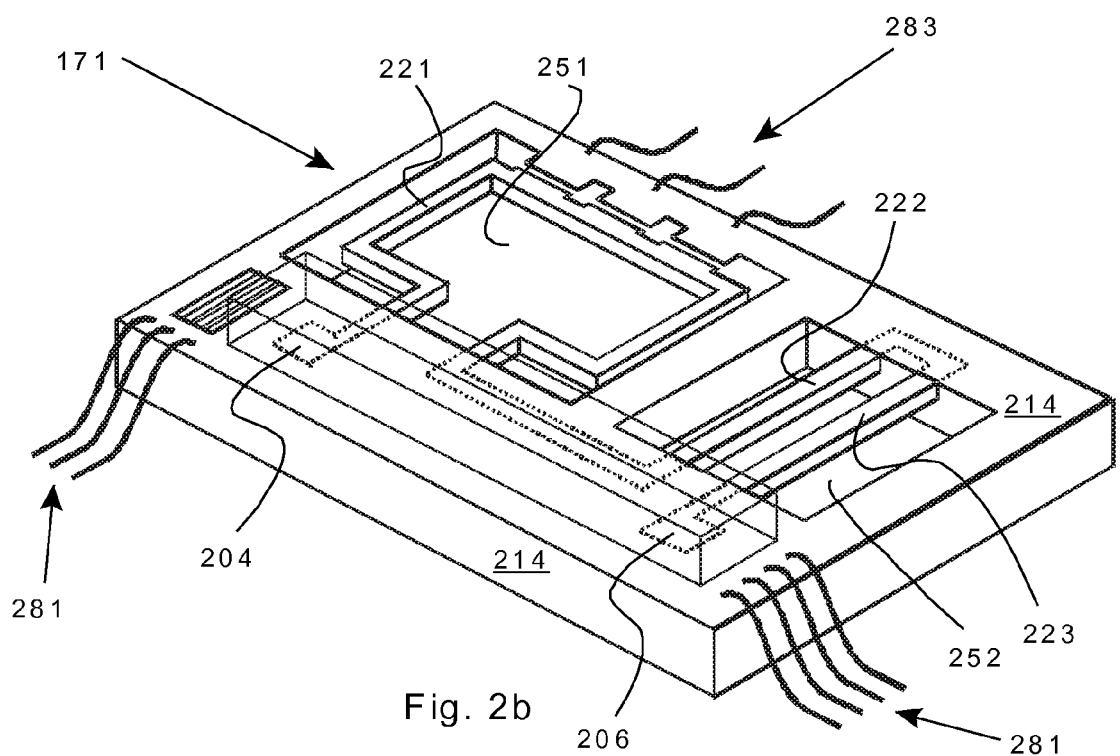
Fig. 2a
Fig. 2b

FLOW METER AND USE THEREOF FOR DETERMINING A FLOW OF A MEDIUM, AS WELL AS A METHOD THEREFOR

BACKGROUND OF THE INVENTION

1. Field of the Invention

The present invention relates to a flow meter for determining a flow of a medium, said flow meter comprising a flow tube for transporting the medium whose flow is to be measured, wherein the flow tube has a first end and a second end at a distance therefrom, and wherein the flow meter is provided with a first flow sensor for measuring the flow of the medium at a first position of the flow tube. The present invention also relates to the use of such a flow meter.

The invention further relates to a method for determining a flow of a medium.

Such a flow meter is known, for example from EP 2078936. The known flow meter is provided with a system chip and comprises a substrate provided with an opening, in which opening a silicon nitride flow tube is present for transporting medium whose flow is to be measured. The flow tube described in EP 2068936 forms part of a Coriolis flow sensor and is suitable for measuring very low mass flows, to values far below 1 gram per hour. In another embodiment, the flow tube forms part of a so-called thermal flow sensor.

The known flow meter and the known method are limited as regards their accuracy and/or measurable range. Although the known flow meter is quite satisfactory, there is a need for a flow meter and a method by means of which the flow, for example the mass flow, can be determined more accurately and/or within a larger measuring range.

2. Description of the Related Art

Accordingly it is an object of the present invention to provide an improved flow meter and an improved method for determining the flow, preferably the mass flow. Additionally it is an object to provide a flow meter at the method by means of which flows, preferably very low flows, such as mass flows of much less than 1 g/h, can be measured with a relatively high degree of accuracy. In addition to that it is an additional object of the present invention to provide a flow meter and a method by means of which a very large range of flows, in particular mass flows, can be measured.

SUMMARY OF THE INVENTION

In order to achieve that object, the present invention provides a flow meter of the kind described in the introduction. The flow meter comprises a flow tube for transporting the medium whose flow is to be measured. The flow meter is provided with a first flow sensor for measuring the flow of the medium at a first position of the flow tube. The first position lies in between the first end and the second end. The flow meter is also provided with a second flow sensor for measuring the flow of the medium at a second position of the flow tube. The second position lies in between the first end and the second end. The first flow sensor and the second flow sensor are designed for measuring the flow through the flow tube, preferably independently of each other. The second, additional flow sensor provides additional measuring data, from which additional information about the flow to be measured can be derived. This additional information makes it possible to measure the flow through the flow tube more accurately, and/or to increase the range of the flow meter, which will be explained in more detail hereinafter. Using the additional flow sensor, an improved flow meter is obtained, therefore. The object of the present invention is thus achieved.

Hereinafter a few of these embodiments and their advantages will be explained in more detail.

The first flow sensor and the second flow sensor may be designed for measuring the flow at the same position of the flow tube. In order to further increase the independence of the measurements of the two flow sensor, it is preferable, however, if the second position is spaced from the first position.

In an embodiment, the first end is a supply end, and the second end is a discharge end positioned downstream from the supply end.

It is possible, however, that the flow tube comprises a further opening, positioned between the two ends, and which further opening is suitable for supplying or discharging the medium of which the flow is to be measured. Preferably, the further opening is positioned between the first and the second position, which positions are preferably positioned at a distance from each other, as described above. With such a further opening it is possible to position the first flow sensor and the second flow sensor in parallel. In absence of a further opening, the flow sensors are positioned in series.

It is noted that the flow tube may comprise several flow tube parts, and that the flow tube does not need to be an integrally formed part.

The flow meter may comprise a flow sensor of the Coriolis type. A Coriolis flow sensor is known per se to those skilled in the art. The first or the second flow sensor may be of the Coriolis type. An embodiment in which both the first and the second flow sensor are of this Coriolis type is also conceivable. A flow sensor of the Coriolis type is quite suitable for measuring the mass flow of the flow on the basis of flow-induced vibrations in the flow tube.

In one embodiment, the flow meter comprises a thermal flow sensor. A flow sensor of this type is known per se to those skilled in the art. The first or the second flow sensor may be a thermal flow sensor. In a very advantageous embodiment, as will be explained hereinafter, both the first and the second flow sensors are thermal flow sensors. Such a sensor is quite suitable for measuring very low mass flows, making use of very small flow-induced temperature changes.

The accuracy of the flow meter can be increased in a very efficient manner if the flow meter comprises calibration means for calibrating the first flow sensor on the basis of at least a signal delivered by the second flow sensor. A signal from the second flow sensor can be used for checking the first flow sensor and adjusting it, if necessary, such that the signal delivered by the first flow sensor is representative of the flow.

Flow sensors are designed for measuring the flow within a specific measuring range. The term "measuring range" as used herein is understood to mean: the range in values of a specific parameter that can be (accurately) measured by the flow sensor. Within this context also the lower boundary that can be measured by the flow sensor and the upper boundary that can be measured by the flow sensor are important. If the flow sensor is designed for measuring the volume flow, for example, said range can be expressed in nanoliters per second. The first flow sensor is designed for measuring the flow within a first measuring range, and the second flow sensor is designed for measuring the flow within a second measuring range.

Another important property of the flow sensors is the response rate. It is important that when a change in the flow occurs, said change is quickly registered by the flow sensor. The response rate of the flow meter according to the present invention can be relatively high, precisely because use is made of two flow sensors.

In order to increase the measurable range of the flow meter in a simple manner, the flow sensors may be selected so that the first measuring range and the second measuring range overlap. Preferably, the flow sensors are configured so that the first measuring range and the second measuring range overlap only partially. In this way the measurable range can be increased in a simple manner.

In a very advantageous embodiment, increasing the measuring range, and/or calibrating the first flow sensor, is possible if the first flow sensor is a thermal flow sensor and the second flow sensor is a flow sensor of the Coriolis type.

In an embodiment in which both the first and the second flow sensor are thermal flow sensors, it is preferable if the first thermal flow sensor is provided with: a first sensor circuit, comprising a first resistor element, which is temperature-sensitive and which is thermally connected to the flow tube, and a second resistor element that can be electrically connected in series therewith; a first voltage measuring element which is electrically connectable between the first and the second resistor element; first heating means for heating the flow tube at least partially at the location of the first resistor element; and wherein the second thermal flow sensor is provided with; a second sensor circuit, comprising a third resistor element which is temperature-sensitive and which is thermally connected to the flow tube, and a fourth resistor element that can be electrically connected in series therewith; a second voltage measuring element which is electrically connectable between the third and the fourth resistor element; second heating means for heating the flow tube at least partially at the location of the third resistor element. In this embodiment, the first sensor circuit is quite preferably electrically connected to the second sensor circuit in such a manner that said first sensor circuit and said second sensor circuit form a first half and a second half, respectively, of a Wheatstone bridge. The flow can in that case be measured with a full Wheatstone bridge, by means of which the flow can be measured in a relatively accurate manner. In this embodiment, both the first half and the second half of the Wheatstone bridge can be separately used for measuring the flow. Each half of the Wheatstone bridge can be regarded as a separate thermal flow sensor.

Preferably, the flow meter is provided with switching means for selectively forming the first half of the Wheatstone bridge from two of the resistor elements and selectively forming the second half of the Wheatstone bridge from two of the remaining resistor elements. The switching means can be used for selectively forming a Wheatstone bridge with four resistor elements from the four (or possibly more) resistor elements that are present. Suitable switching makes it possible to eliminate measurement errors in the flow meter, and possibly for correcting or calibrating the first half of the Wheatstone bridge (first flow sensor) on the basis of the signal obtained by the second half of the Wheatstone bridge (second flow sensor).

In order to further increase the accuracy of the flow meter, it is preferable if the second resistor element and/or the fourth resistor element in the Wheatstone bridge is/are temperature-sensitive. The temperature-sensitive resistor element may be connected to the flow tube, but it may also be used for measuring the temperature of the system chip, possibly for the purpose of thus calibrating for changes in the temperature thereof.

Quite preferably, the second resistor element and/or fourth resistor element are thermally connected to the flow tube.

The first half of the Wheatstone bridge may be designed for measuring the flow through a first part of the flow tube. The second half of the Wheatstone bridge may be designed for measuring the flow through a second part of the flow tube. Said parts (first part and second part), may be identical to each other. It is preferable, however, if said first and said second part are essentially spaced from each other. In one embodiment, the first and the second resistor element are connected to the first part of the flow tube, and the third and the fourth resistor element are connected to a second part of the flow tube, which first and second parts are essentially spaced from each other.

In order to make correction for internal temperature gradients possible, it is preferable if the first part and the second part are disposed opposite each other. Preferably, said parts extend parallel to each other. It is preferable in that regard if said parts are disposed so that the directions of flow through said parts are essentially opposite to each other. As a result, the effects of external temperature gradients on the signal from the thermal sensor are averaged out.

In order to obtain a compact and simple flow sensor, it is preferable if the first heating means comprise at least the first and/or the second resistor element. Additionally, or separate therefrom, the second heating means may comprise at least the third and/or the fourth resistor element.

An additional advantage of the flow meter according to the invention is that it is very suitable for carrying out measurements on different types of medium, among which different gases and/or liquids. If a thermal flow sensor is used with a Coriolis flow sensor, the thermal flow sensor may be calibrated for thus correcting for differences in, for example, the density of the medium.

According to one aspect, the invention relates to the use of a flow meter according to the present invention. Said use enables the user to determine the flow in a relatively accurate manner. Additionally, the use of the flow meter makes it possible to determine the flow over a larger measuring range. Further advantages of such a use of a flow meter have already been discussed in the foregoing.

According to one aspect, there is provided a method for determining a flow of a medium, preferably by means of a flow meter as described in the foregoing. The method comprises the steps of A. providing a flow tube; B. transporting a medium whose flow through the flow tube is to be determined; C. measuring the flow of the medium at a first position of the flow tube; D. determining the flow of the medium on the basis of one or more obtained measuring data. The method is characterised by the further step of E. measuring the flow of the medium at a second position of the flow tube. According to the method, the flow through the flow tube is measured by carrying out two different steps. Preferably, said steps are carried out independently of each other, such that the first measurement hardly influences the second measurement, if at all. Measuring at the second position provides additional measuring data, from which additional information about the flow to be measured can be derived, therefore. Said additional information makes it possible to measure the flow through the flow tube more accurately, and/or to increase the range of the flow meter, as already explained in more detail in the foregoing but will be explained more specifically again in relation to the method.

Advantageous embodiments of the methods and their advantages will be explained in more detail hereinafter.

In one embodiment of the method, the second position is different from the first position. By measuring at two different positions, the independence of the various measurements is further increased.

Step E. is preferably carried out simultaneously with step C. Measuring simultaneously achieves that time effects on the flow do not play a part, or at least to a lesser extent, when comparing the various measuring values.

As already explained above, it is conceivable that in step C. the flow within a first measuring range is measured and that in step E. the flow within a second measuring range is measured. Said measuring ranges may be identical to each other, but it may also differ from each other. It is possible in that connection for the first measuring range and the second measuring range to overlap. The first measuring range and the second measuring range may overlap only partially. It is also conceivable for the measuring ranges not to overlap at all.

It is very advantageous if step C. is carried out with a first flow sensor, wherein the method comprises the further step of collecting and/or calibrating the first flow sensor on the basis of one or more measuring data obtained in step E.

In a preferred embodiment, the first flow sensor is a thermal flow sensor, and step E. is carried out with a second flow sensor of the Coriolis type. The flow sensor of the Coriolis type can be excellently used for correcting and/or calibrating the first flow sensor, for example the thermal flow sensor. Conversely it is also possible, of course, to use the thermal flow sensor for calibrating the Coriolis flow sensor.

BRIEF DESCRIPTION OF THE DRAWING FIGURES

The invention will be explained in more detail hereinafter by means of a description with reference to the appended figures. In the figures:

FIG. 1b is a top plan view of the flow meter shown in FIG. 1a;

FIG. 1c is a sectional view of the flow meter shown in FIG. 1a;

FIG. 2a is a perspective view of an embodiment of a flow meter according to the present invention;

FIG. 2b is a perspective view of an embodiment of a flow meter according to the present invention;

FIG. 2c is a perspective view of an embodiment of a flow meter according to the present invention;

FIGS. 4a-d are schematic top plan views of a embodiments of a flow meter according to the present invention;

FIGS. 5a-d are schematic overviews of the measuring range of an embodiment of a flow meter according to the present invention.

Figure 6:
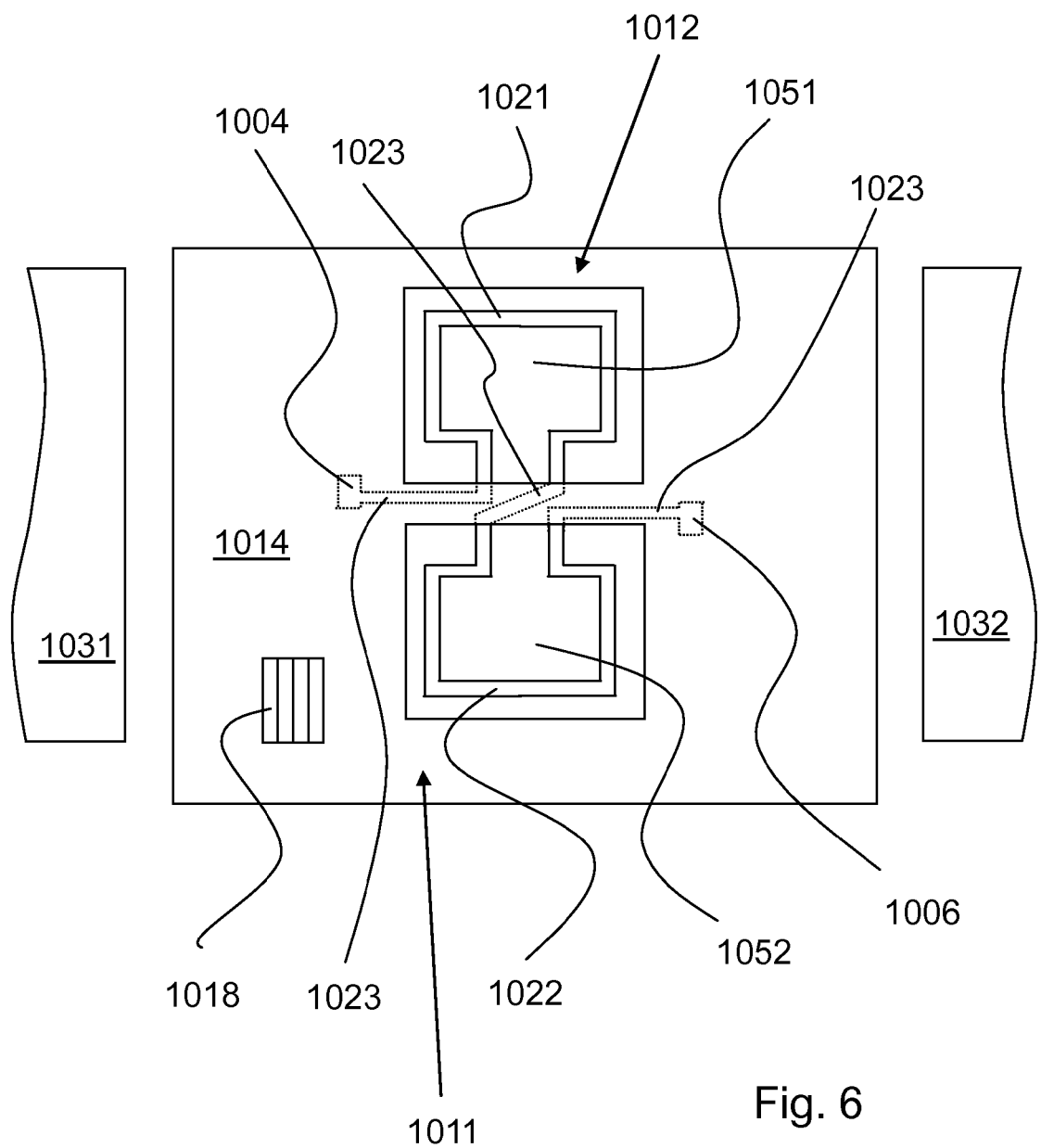

FIG. 6 is a perspective view of an embodiment of a flow meter according to the present invention;

DETAILED DESCRIPTION OF THE INVENTION

Figure 1A:
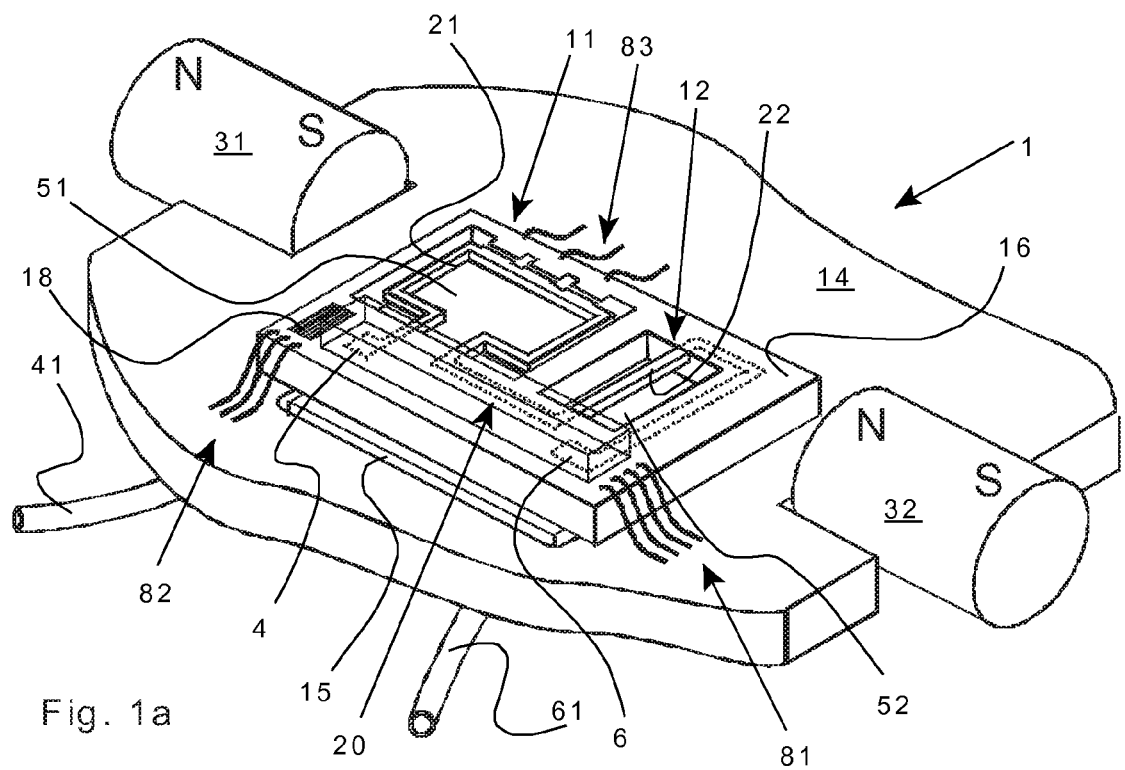
FIG. 1a is a perspective view of an embodiment of a flow meter according to the present invention.

FIG. 1a shows a flow meter 1. The flow meter 1 is provided with a system chip comprising a monocrystalline silicon substrate 16 provided with two openings 51, 52 that have been etched therein. The monolithic system chip 16 is combined into one unit with two permanent magnets 31, 32 disposed opposite each other, which are mounted on a carrier 14, for example a PCB (printed circuit board) of a ceramic or a plastic material with copper conductors thereon. The substrate 16 is made from an Si wafer and is mounted on the carrier 14. The electrical connections between the system chip and the carrier are provided by so-called bond wires in groups 81, 82, 83.

Provided in and on the system chip is a flow tube 21, 22 for transporting a medium whose flow is to be measured. The flow tube 21, 22 comprises a first end 4 in the form of a supply end 4 and a second end 6 in the form of a discharge end 6 disposed downstream thereof. The flow tube is provided with a first flow sensor 11 and a second flow sensor 12 for measuring the flow through the flow tube 21, 22 at a first and a second position.

The flow meter 1 comprises a Coriolis flow sensor 11, with a silicon nitride Coriolis tube 21 in the illustrated embodiment, which is freely suspended in a first opening 51. Such a flow meter is known per se to the skilled person, for example from EP 2 078 936, which document is incorporated in the present patent application by reference. For a correct understanding of such a sensor it suffices to say that a mass flow through the Coriolis tube will lead to a vibration of the Coriolis tube that is related to said mass flow. The vibration can be read out by means of read-out elements. The Coriolis tube is loop-shaped, said loop shape being a rectangular shape in this case. Other loop shapes, such as triangular, trapezoidal or U-shapes are also conceivable, of course.

The system chip shown in FIG. 1 may comprise an absolute pressure sensor 18, such as a Pirani pressure sensor 18, for example in that it is integrated in or on the substrate 16. The pressure sensor 18 can be used for correcting the measured vibration of the Coriolis tube 21 for the air pressure.

Provided at a second position of the flow tube is a thermal flow sensor 12, with a silicon nitride tube part 21 that is fixedly suspended in a second opening 52. The second position is spaced from the first position. In the situation shown in FIG. 1a, the tube part 21 of the thermal flow sensor 12 crosses the opening entirely, and the connecting part 23 of the tube part with the discharge and is an embedded channel 23 in the substrate (see FIG. 1b). A thermal flow sensor is known per se to the skilled person, although it can be configured in many ways. A few possible embodiments of the thermal flow sensor will be explained in more detail hereinafter.

In one embodiment, the thermal flow sensor comprises a Wheatstone bridge (not shown) comprising four resistor elements, at least one temperature-sensitive resistor of which is thermally connected to the flow tube. A heating element heats a part of the flow tube that is located in the vicinity of the temperature-sensitive resistor. Depending on the mass flow in the tube, the flow in the tube will carry along heat in downstream direction. As a result, the temperature at the location of the temperature-sensitive resistor will increase or decrease, depending on whether the temperature-sensitive resistor is disposed downstream or upstream, respectively, of the heating element. The increase or decrease in temperature leads to a change in the resistance of the temperature-sensitive resistor, which can subsequently be read out by means of the Wheatstone bridge and can be related to a measure of the flow, preferably to the mass flow of the medium.

In one embodiment (not shown), the thermal flow sensor comprises two tube parts disposed opposite each other, which are each provided with a temperature-sensitive resistor. Each temperature-sensitive resistor is incorporated in one half of the Wheatstone bridge. Further variations of the thermal flow sensor are conceivable, of course.

Figure 3A:
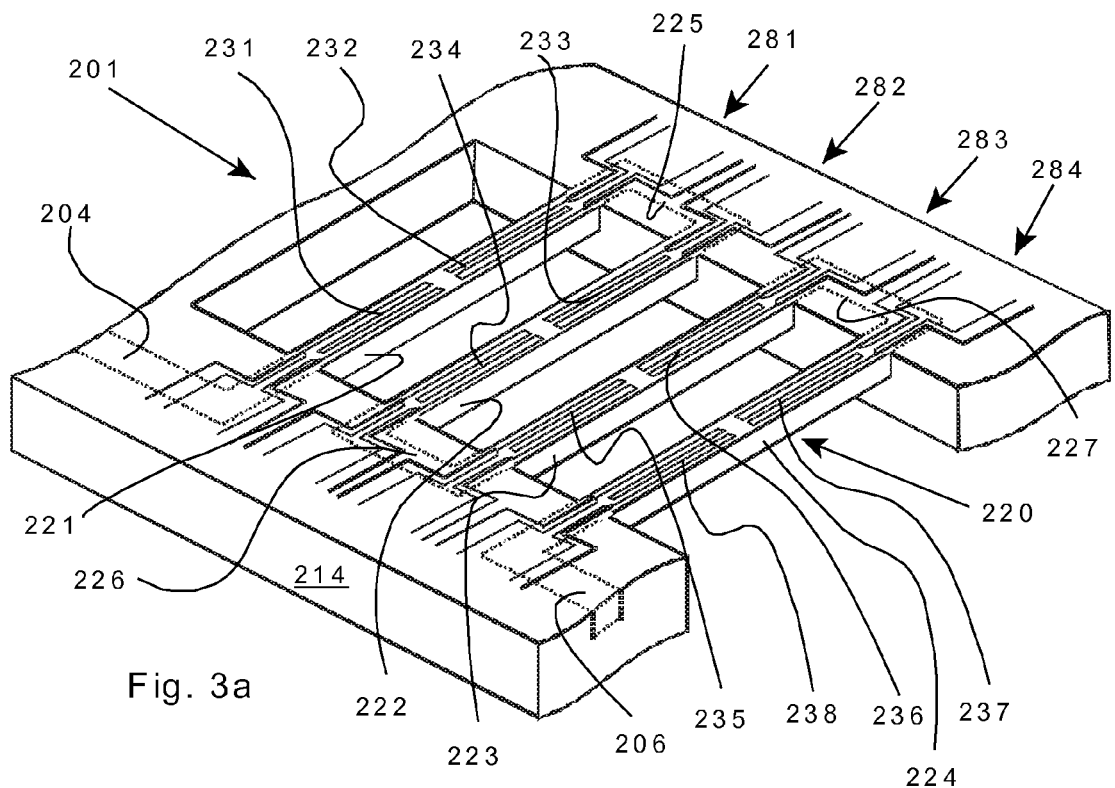
FIG. 3a is a perspective view of an embodiment of a flow meter according to the present invention.
Figure 3B:
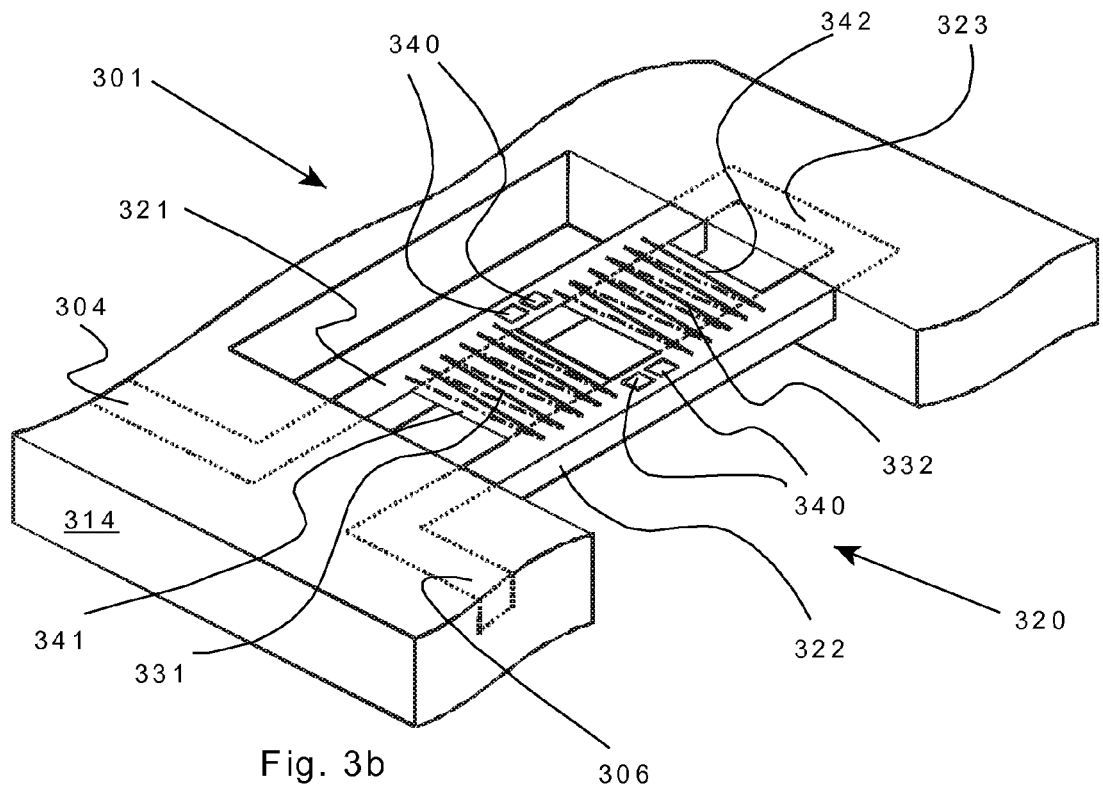
FIG. 3b is a perspective view of a thermal flow sensor.

An embodiment of a thermal sensor that is known per se is shown in FIG. 3b. The thermal flow sensor 301 that is shown in said figure comprises a flow tube 320, which comprises two silicon nitride tube parts 321, 322 which are fixedly suspended in the opening in the substrate 314. Via embedded channels having an inlet 304 and an outlet 306, medium can flow through the flow tubes 321, 322. Two heater elements 340 are placed on the first tube part, in the centre of the tube part. Heater elements 340 are also placed on the second tube part 322. Two thermopiles 331, 332 are symmetrically arranged between the two legs 321, 322 on either side of the heaters 340. A film 341, 342 is provided between the two legs, on which film the thermopiles 331, 332 are supported.

In one embodiment (not shown) of the thermal flow sensor, said thermal flow sensor comprises a loop-shaped tube essentially in the form of a U, which is freely suspended. A heating resistor is arranged in the centre of the connecting leg of the free tube. A thermopile is arranged between the two legs of the free tube for measuring a temperature difference between the legs, which temperature difference is a measure of the flow. Such a flow sensor is known, for example from EP 774 649. The U-shaped tube may be fixed to the opposite wall of the opening with the connecting leg of the U, or may extend into the substrate via an embedded channel (analogously to the embodiment shown in FIG. 2b). A double version of the above-described thermal sensor is obtained by providing a heater resistor on both legs, for example in the centre thereof. Thermopiles may be symmetrically arranged between the two legs on either side of the heaters.

Figure 1B:
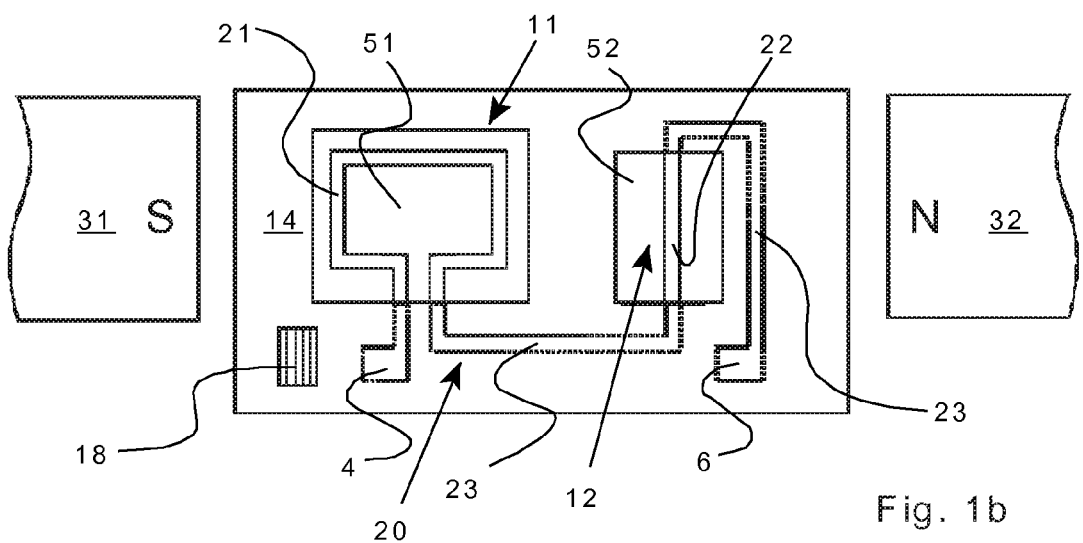

FIG. 1b shows a top plan view of the system chip of FIG. 1a. Like parts are indicated by the same numerals. The figure clearly shows that the system chip comprises a flow tube 20, which extends between the first connection 4 and the second connection 6. At the location of the first opening 51, the flow tube 20 forms part of a Coriolis flow meter 11. At the location of a second opening 52, the flow tube 20 forms part of a thermal flow sensor 12. Depending on the selected connection, the medium may first flow through the flow tube part of the thermal flow sensor 12 and subsequently through the flow tube part of the Coriolis flow sensor 11, or conversely. The sequence to be selected of the two flow sensors is not limited.

Figure 1C:
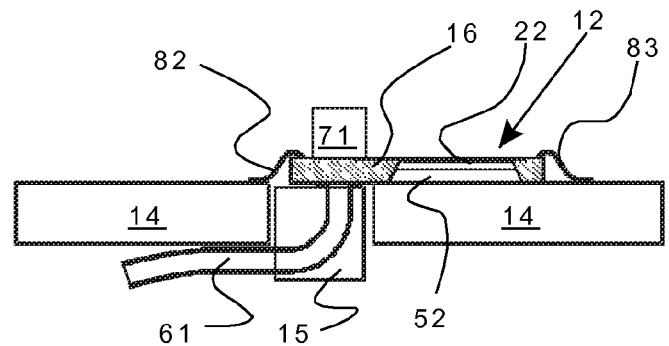

FIG. 1c shows the device of FIG. 1a, along a section at the location of the thermal flow sensor 12. The figure clearly shows the manner in which the hydraulic connection between the connections 6 (end parts) of the flow tube 20 and further flow tubes 61 is effected by means of a pressure block 71 and a pressure block 15.

FIG. 2a shows a flow meter 101 according to another embodiment. In the illustrated embodiment, the flow meter 101 is provided with a system chip comprising a monocrystalline silicon substrate 114, which is provided with an opening 152 that has been etched therein. The system chip may be made analogously to the system chip described above with reference to FIG. 1a.

Provided in and on the system chip is a flow tube 120 for transporting medium whose flow is to be measured. The flow tube 120 comprises a first end 104 in the form of a supply end 104 and at a distance therefrom, a second end 106 in the form of a discharge end 106, positioned downstream from the supply end. The flow tube 120 is loop-shaped with two legs 121, 122 and a connecting part 123. The two legs cross the opening 152 entirely, and there is an embedded channel 123 (illustrated in dotted lines) in the substrate, which forms the connecting part of the two legs. The flow tube is provided with a first thermal flow sensor 111 and a second thermal flow sensor 112 for measuring the flow through the flow tube 120 at a first and a second position.

The first thermal flow sensor 111 is provided on the first leg 121. The first thermal flow sensor 111 is provided with a first resistor element 133, which is temperature-sensitive and which is thermally connected to the flow tube 121. A second resistor element 133 is provided at a location spaced from the first resistor element 133. In the illustrated embodiment, said second resistor element is temperature-sensitive and thermally connected to the flow tube 121, although this is not absolutely necessary. The resistor elements 131, 132 form part of a first sensor circuit. The first resistor element 133 is electrically connected in series to the second resistor element 132. A first voltage measuring element is connectable between the first resistor element 131 and the second resistor element 132. The resistor elements form heating means for heating the flow tube at least partially at the location of the first resistor element 131. With this object in mind it is also possible, however, to provide separate heating elements, as for example described above with reference to FIG. 3b.

The second thermal flow sensor 112 is provided on the second leg 122. Analogously to the first thermal flow sensor, the second thermal flow sensor 112 is provided with a second sensor circuit comprising a third resistor element 133, which is temperature-sensitive and which is thermally connected to the flow tube 122, and 5a fourth resistor element 134, which can be electrically connected in series thereto. In the illustrated embodiment, the fourth resistor element 134 is temperature-sensitive and thermally connected to the flow tube 122, although this is not absolutely necessary. A second voltage measuring element is connectable between the third resistor element 133 and the fourth resistor element 134. The second leg 122, too, comprises heating means for heating the flow tube 122 at least partially at the location of the third resistor element 133. In this embodiment, the resistor elements form heating elements, although other embodiments are conceivable.

FIG. 2c schematically shows the two spaced-apart tube parts 121, 122 of FIG. 2a. The direction of flow through the tube parts 121, 122 is indicated by the arrows F1, F2. In the first tube part 121, the flow takes place from the left to the right in the drawing (indicated by the arrow F1), in the second tube part 122 the flow takes place in the opposite direction, viz. from the right to the left in the drawing (indicated by the arrow F2). The first tube part 121 comprises two spaced-apart resistors 131, 132, which are temperature-sensitive. The two resistors form part of a first half of a Wheatstone bridge, as described above with reference to FIG. 2a. The resistors 131, 132 are also configured as heating elements for heating the tube part 121. The second tube part 122 is configured analogously to the first tube part 121, comprising two temperature-sensitive resistors 133, 134 which are thermally connected to the second tube part 122. Said resistors, too, function as heating elements for heating the second tube part. A dotted line M0, M0' illustrates the temperature profile of the two tube parts in the situation where there is no flow through the tube part.

If a flow occurs, the temperature in the tube parts 121, 122 will change. This is schematically illustrated in the full line M1, M1'. In the first tube part 121 the temperature in the part upstream of the centre of the tube part will decrease as a result of the flow and increase in the part downstream thereof. The decrease and the increase are a measure of the flow. The same applies as regards the second tube part 122. As a result of the flow, the temperature will successively decrease an increase in the second tube part as well. The temperature changes over time can be determined relatively accurately by means of the temperature-sensitive resistors on 31, 132, 133, 134, so that the flow through the tube parts 121, 122 is also measurable. Any temperature gradients in the direction of flow F1, F2 (for example because one side of the substrate is hotter than the other) are averaged out in that the effect of the temperature gradient on the measuring results for the first tube part is the exact opposite of the effect of the temperature gradient on the measuring results of the second tube part.

Figure 2D:
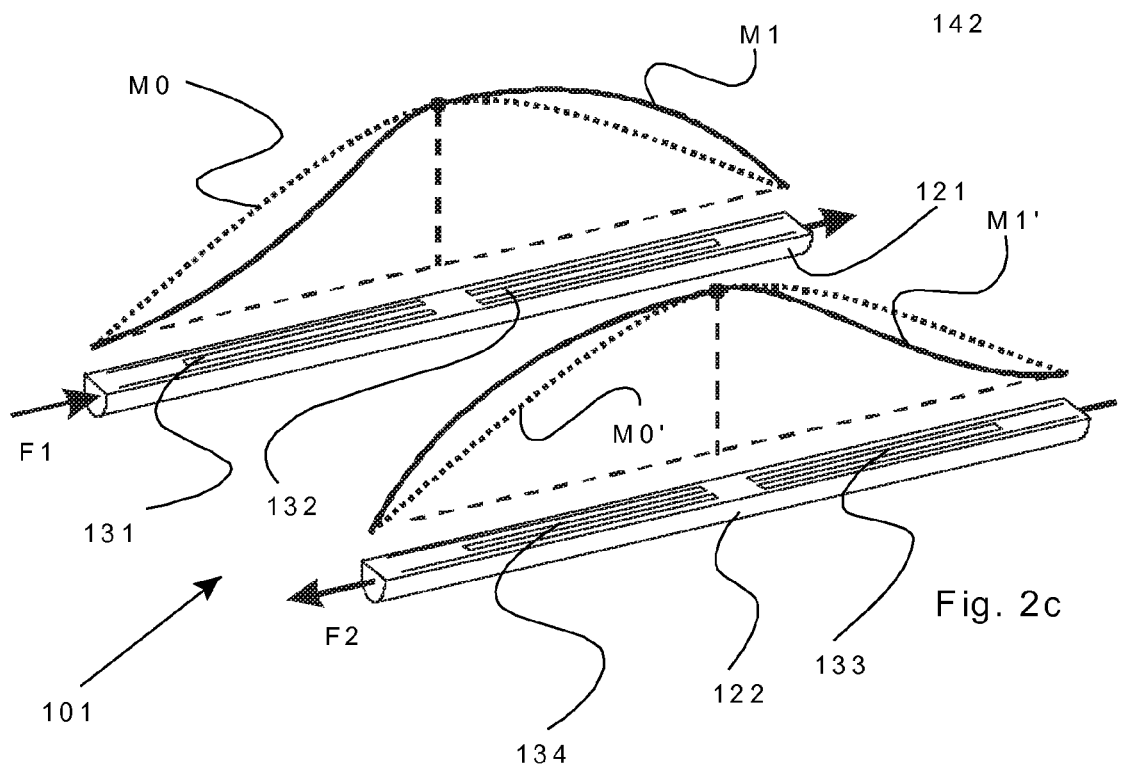
FIG. 2d shows a first diagram of connections.
Figure 2D:
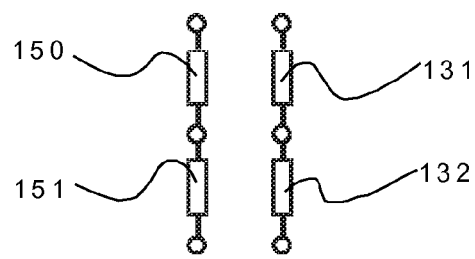

As shown in FIG. 2d, the first resistor element 131 and the second resistor element 132 may be electrically connected in such a manner as to form a half Wheatstone bridge. Using reference resistors 150, 151, the measure of the flow can then be determined on the basis of the resistance change in the first resistor element 131 and/or the second resistor element 132. The third resistor element 133 and the fourth resistor element 134 may be configured in the same way, connected as a half Wheatstone bridge, with reference resistors 150, 151 as the complementary half of the Wheatstone bridge.

Figure 2E:
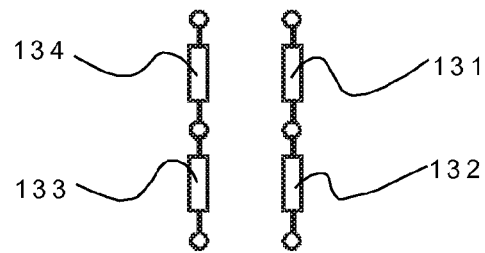
FIG. 2e shows a second diagram of connections.

In a special embodiment, the first thermal flow sensor 111 and the second thermal flow sensor 112 are electrically connected, as schematically shown in FIG. 2e, and that in such a manner that the first sensor circuit and the second sensor circuit form a first half and a second half, respectively, of a Wheatstone bridge. The flow can in that case be measured with a full Wheatstone bridge, by means of which the flow can be measured in a relatively accurate manner. In this embodiment, both the first half and the second half of the Wheatstone bridge can be used separately for measuring the flow. Each half of the Wheatstone bridge can thus be regarded as a separate thermal flow sensor.

Figure 2F:
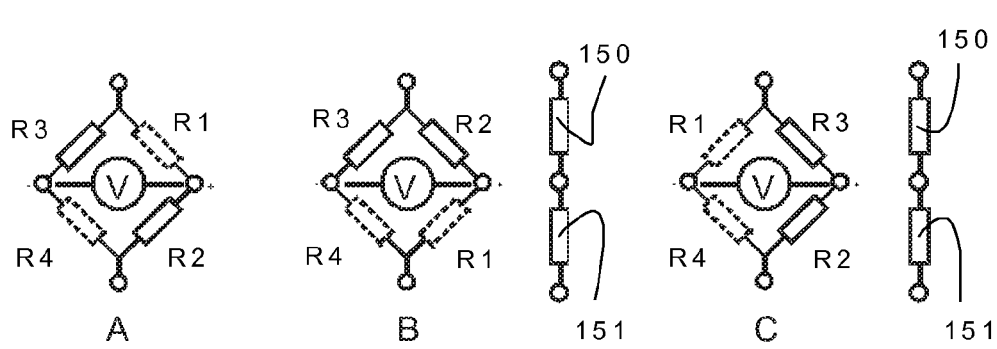
FIG. 2f is a schematic overview of possible circuits of measuring resistors in one embodiment of a flow meter.

In a special embodiment, the resistors in the Wheatstone bridge can be selectively connected. The flow meter may to that end be provided with switching means for selectively forming the first half of the Wheatstone bridge from two of the resistor elements and selectively forming the second half of the Wheatstone bridge from two of the remaining resistor elements. Several configurations are possible, which configurations are shown in FIG. 2f. A flow-cooled resistor (the temperature at the location of the resistor decreases) is indicated in a dotted line, and a flow-heated resistor (the temperature at the location of the resistor increases) is indicated in a full line.

In the first configuration, indicated by the letter A in FIG. 2f, a measuring circuit is obtained which can be used for measuring the flow. In said configuration, the first half of the Wheatstone bridge comprises a cold resistor R1 and a hot resistor R2, and the second half of the Wheatstone bridge also comprises a cold resistor R4 and a hot resistor R3. In the situation shown in FIG. 2c, R1 corresponds to the resistor element 131. R2 corresponds to the resistor element 132, R3 corresponds to the resistor element 134 and R4 corresponds to the resistor element 133. The hot resistors R2, R3 are disposed diagonally opposite each other in the Wheatstone bridge, as it were, as are the cold resistors R1, R4. Permutations of the various resistors are conceivable, of course. Said switching in this configuration A can be used for correcting for a fixed error.

In the second configuration, indicated by the letter B in FIG. 2f, a measuring circuit is obtained which can be used for calibrating the measuring circuit. In this configuration, the so-called common offset is measurable. In said configuration, the first half of the Wheatstone bridge comprises a cold resistor R1 and a hot resistor R2, and the second half of the Wheatstone bridge also comprises a cold resistor R4 and a hot resistor R3. The hot resistors are disposed beside each other, as it were, as are the cold resistors. Permutations of the various resistors are conceivable, of course.

In the third configuration, indicated by the letter C in FIG. 2f, a measuring circuit is obtained from two parts of the Wheatstone bridge that normally oppose one another. The first half of the Wheatstone bridge comprises all the hot resistors R3, R2, whilst the second half of the Wheatstone bridge comprises all the cold resistors R1, R4. The measured value of the Wheatstone bridge should equal zero in this situation. In case of a deviation, correction for this is possible. Permutations of the various resistors are conceivable, of course.

The flow meter 101 of FIG. 2a can also be used as a thermal flow sensor in combination with the Coriolis flow sensor 11 shown in FIG. 1a.

FIG. 2b is a view of the flow meter 171 of FIG. 1a, in which the thermal flow sensor 12 of FIGS. 1a-c has been exchanged for the flow meter 101 of FIG. 2a. In fact, a flow meter 171 comprising a flow tube with three flow sensors for measuring the flow of the medium at three (different) positions is obtained here.

FIG. 3a shows an embodiment of a flow meter 201 with a total of four thermal flow sensors. The flow meter comprises a flow tube 220 with an inlet 204 and an outlet 206, and with a total of four tube parts 221, 222, 223, 224, which are each freely suspended in an opening in a substrate 214. Via embedded channels 225, 226, 227 a loop-shaped float tube is obtained. Each tube part comprises a half Wheatstone bridge, each half comprising two resistor elements (231, 232; 233, 234; 235, 236; 237, 238) which are temperature-sensitive and which also serve as heating elements. The four half Wheatstone bridges can be selectively combined to form a full Wheatstone bridge. Using this embodiment it is possible to correct both for temperature gradients in the direction of flow (the longitudinal direction of the tube parts) and for temperature gradients in a direction perpendicular to the direction of flow, in the plane of the tube parts. Additionally it is possible to selectively connect the individual resistors in the Wheatstone circuit as described above with reference to FIG. 2f.

Figure 3C:
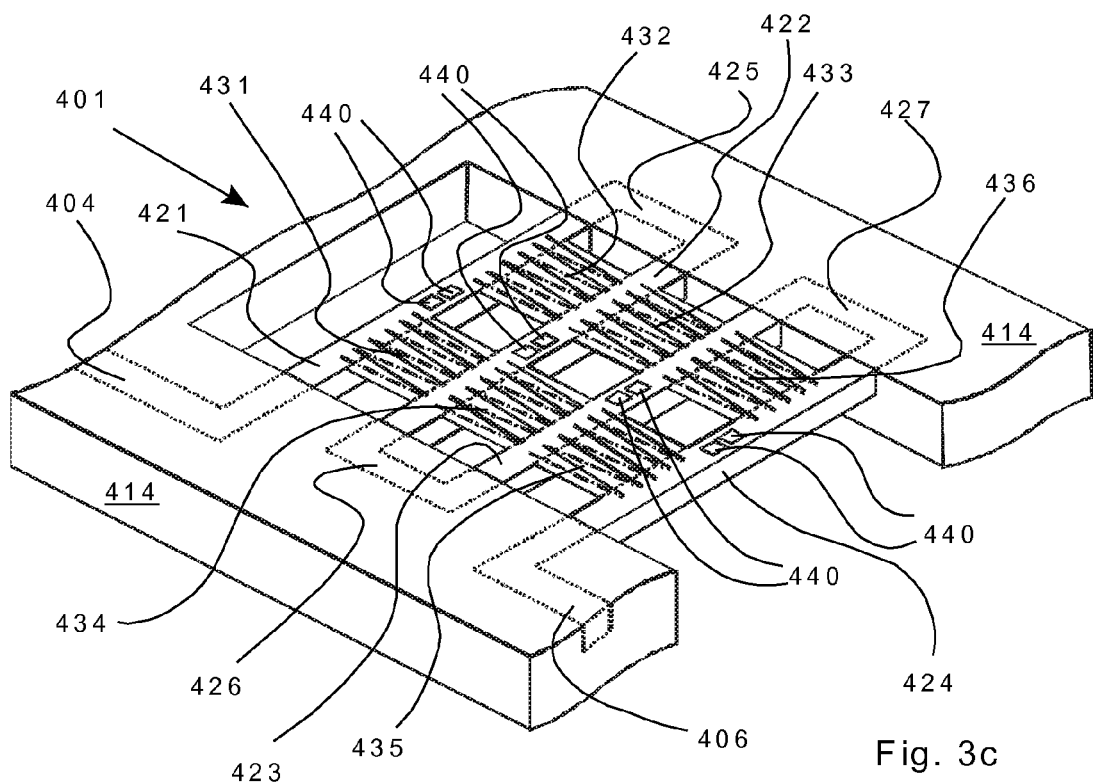
FIG. 3c is a perspective view of an embodiment of a flow meter according to the present invention.

FIG. 3c shows an embodiment of a flow meter 401 comprising a number of thermal flow sensors placed on a flow tube 420. The flow tube again has a first end 404, and a second end 406, in this embodiment respectively a supply end 404 and a discharge end 406. In this embodiment, too, a few (four in total) tube parts 421, 422, 423, 424 are provided, which extend freely between an opening in the substrate 414. The various tube parts 421, 422, 423, 424 are connected via embedded channels 425, 426, 427 for forming a loop-shaped flow tube 420. Heater elements are provided in the centre of each tube part. Adjacent tube parts are connected by means of respective thermopiles 431, 432, 433, 434, 435, 436, analogously to the thermal flow sensor described with reference to FIG. 3b. The embodiment of FIG. 3c, however, has the advantage that corrections for temperature gradients in the plane of the substrate 414 are possible.

Figure 3D:
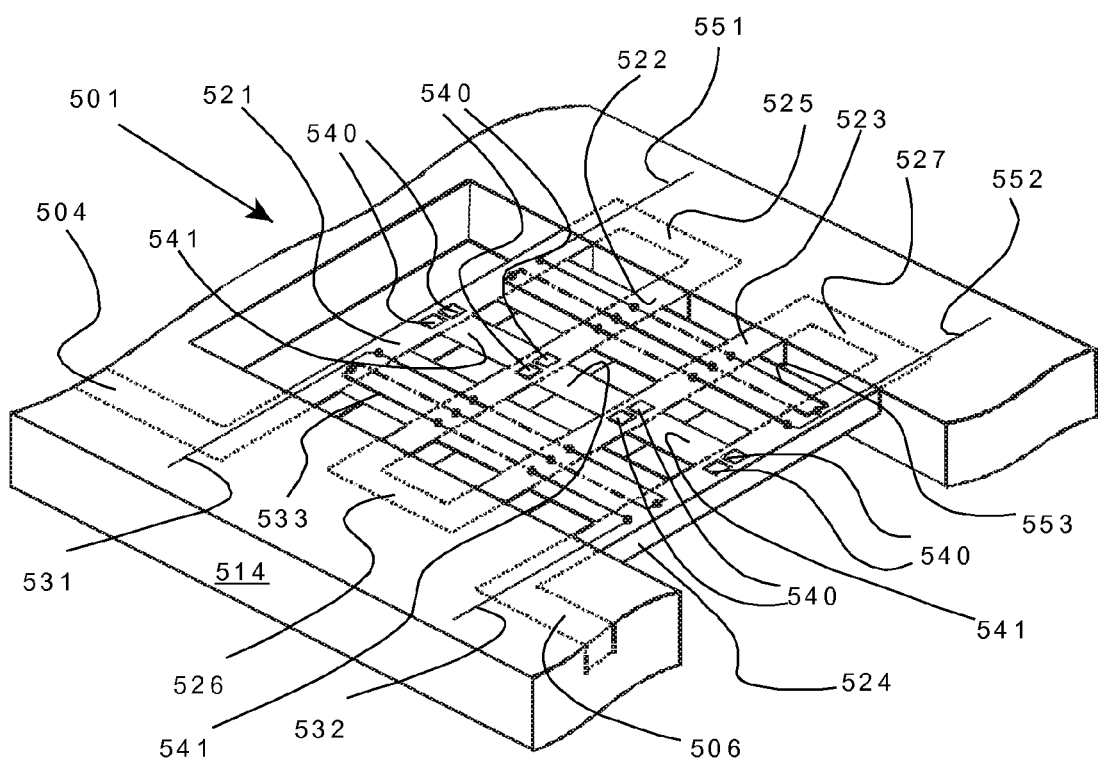
FIG. 3d is a perspective view of an embodiment of a flow meter according to the present invention.

FIG. 3d shows an embodiment of a flow meter 501 with a flow tube comprising four tube parts 521, 522, 523, 524, which are provided with two thermal flow sensors 533, 553. The tube parts are connected via embedded channels 525, 526, 527. The tube parts are each provided with heater elements 540 in the centre of each tube part. A thermopile 533, 553 is placed on either side of each of said heater elements. Each thermopile extends perpendicularly to the direction of flow, over a total of four tube parts. Connections 531, 532, 551, 552 for reading the thermopiles 533, 553 are provided. Also in this embodiment, corrections for temperature gradients in the plane of the substrate 514 are possible.

FIGS. 4a-4d show alternatives of a flow meter according to the present invention. In the figures, the inlet and outlet are consistently named as such. Those skilled in the art will appreciate, however, that the outlet can also be used as an inlet, and conversely. It will later become apparent that the outlet and the inlet may both at the same time function as outlets, or inlets, by making use of a further opening.

Figures 4A, 4B:
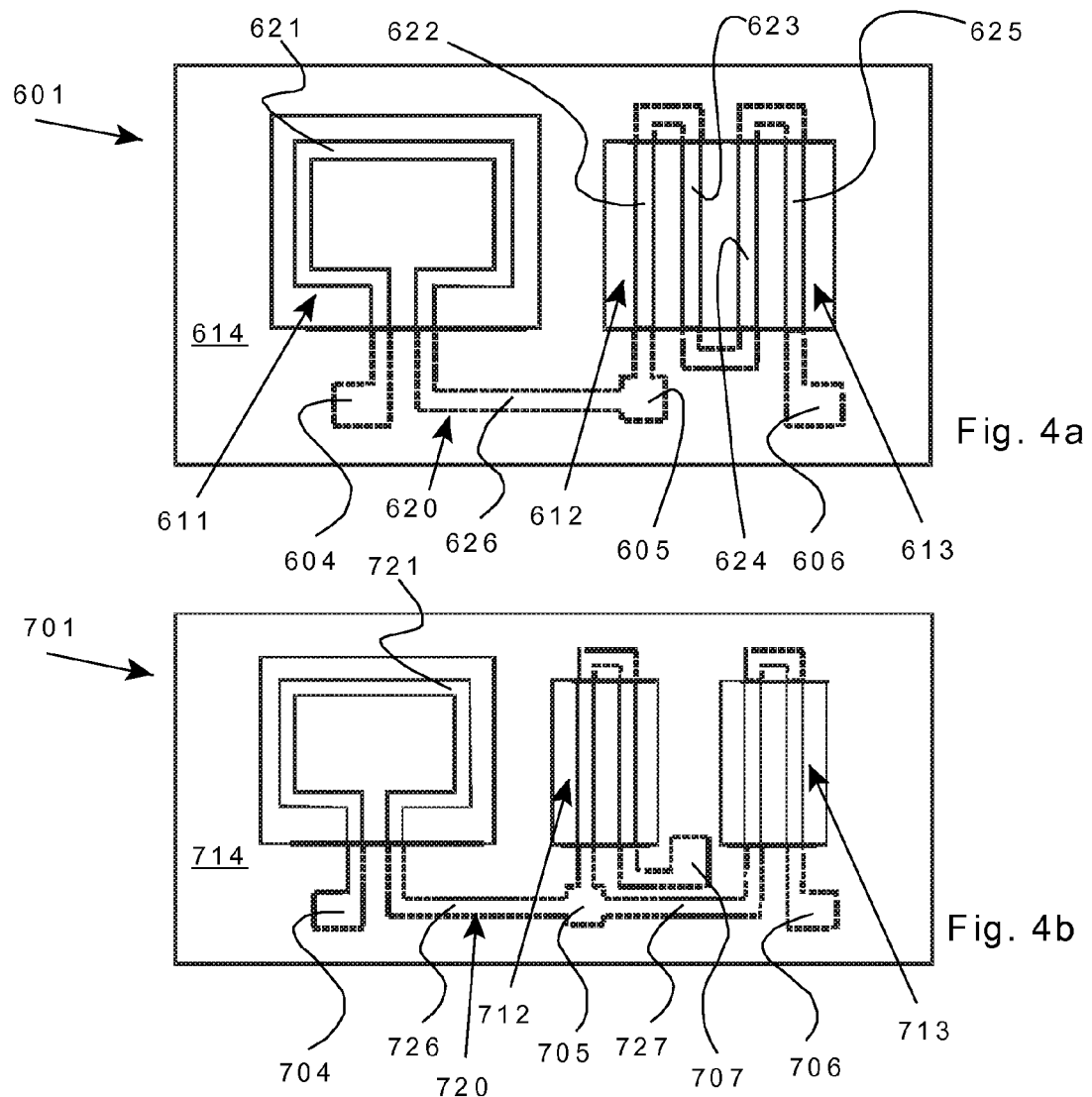

FIG. 4a shows an embodiment of a flow meter 601 with a flow tube 620 comprising an inlet 604 and an outlet 606. The flow tube 620 comprises a Coriolis flow sensor 611 and a thermal flow sensor 612, for example in the form of a thermal flow sensor as shown in FIG. 3a, FIG. 3c or FIG. 3d. An embodiment comprising two series-connected thermal flow sensors 612, 613, for example as shown in FIG. 3, is also conceivable, however. Provided between the Coriolis flow sensor 611 and the thermal flow sensor 612, 613 is a further inlet or outlet 605, which can be selectively used for bypassing the Coriolis flow sensor 611 or the thermal flow sensor(s) 612, 613.

The further inlet or outlet 605 may, in one embodiment, be used as the sole supply opening. The inlet 605 is then a supply end, such that the Coriolis flow sensor 611 is positioned in parallel to the thermal flow sensors 612, 613. The supply end 704 then functions as a discharge opening, en the same hold for discharge end 706. Additionally, it is conceivable that, in line with the embodiment shown in FIG. 1b, only one Coriolis flow sensor 11 is positioned in parallel to only one thermal flow sensor 12.

FIG. 4b shows a flow meter 701 with a flow tube 720 comprising an inlet 704 and an outlet 706. The flow tube 720 comprises a Coriolis flow sensor 711 and two parallel-connected thermal flow sensors 712, 713, for example as shown in FIG. 2a. Each thermal flow sensor can thus effectively consist of more than one thermal flow sensor. AT-unction 705, which is embedded in the substrate 714, is provided for realising said parallel connection.

Figure 4C:
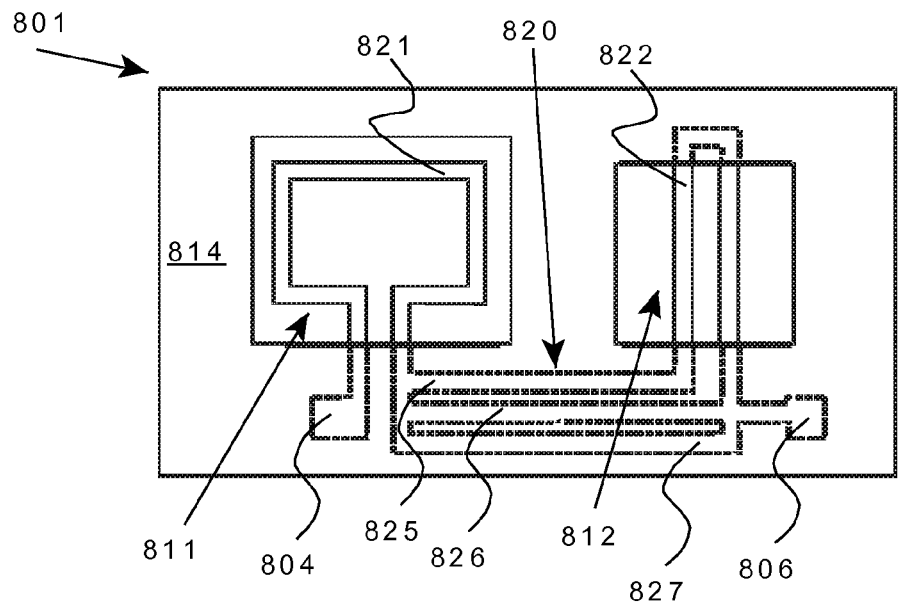

FIG. 4c shows a flow meter 801 with a flow tube 820 comprising an inlet 804 and an outlet 806. The flow tube 820 comprises a Coriolis flow sensor 811 and a thermal flow sensor 812, for example as shown in FIG. 2a. Said flow meter is provided with one or more shunt tubes 826, 827 connected in parallel to the thermal flow sensor, which shunt tubes are embedded in the substrate 814. The addition of the shunt tubes 826, 827 makes it possible to allow a greater flow through the Coriolis flow sensor 811 in comparison with the thermal flow sensor 812 and thus gear the flow to the range of the individual flow sensors.

Figure 4D:
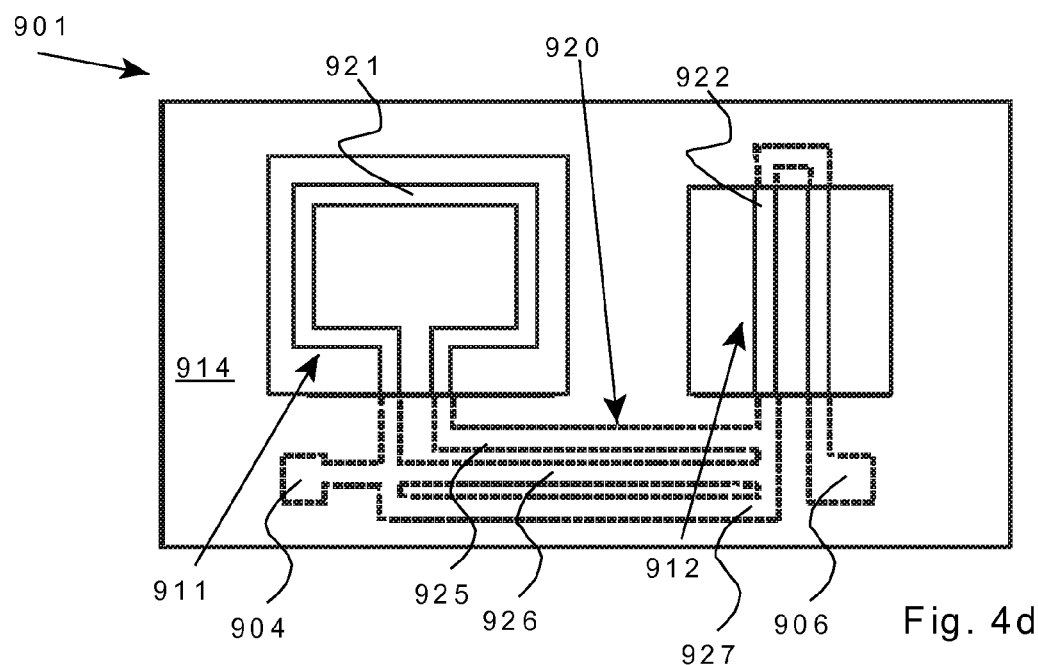

FIG. 4d shows a flow meter 901 with a Coriolis flow sensor 911 and a thermal flow sensor 912, for example as shown in FIG. 2a, in which the shunt tubes 926, 927 are positioned slightly differently, and that in such a manner that precisely the Coriolis flow sensor 911 receives a lower flow than the thermal flow sensor 912.

FIGS. 5a-5d show a graphic representation of the measuring range of a flow meter with a flow tube comprising at least one Coriolis flow sensor and at least one thermal flow sensor. The measuring range of the Coriolis flow sensor is illustrated in a dark dotted line and the measuring range of the thermal flow sensor is illustrated in a full line. The actual mass flow of the medium through the flow tube is shown on the horizontal axis. The output signal from the sensor is shown on the vertical axis.

In all of the figures, the output signal from the two flow sensors is important. The first output signal is represented on the Y1 axis; the second is represented on the Y2 axis. The signals in question are thus two signals which each represent a specific range of the mass flow X shown on the horizontal axis.

The Coriolis sensor is by nature a mass flow sensor. The signal is to a large degree only dependent on the actual mass flow, therefore. The thermal flow sensor is more sensitive, to be true, but in addition to that it is also sensitive to the density and the heat capacity of the flowing medium.

Figure 5A:
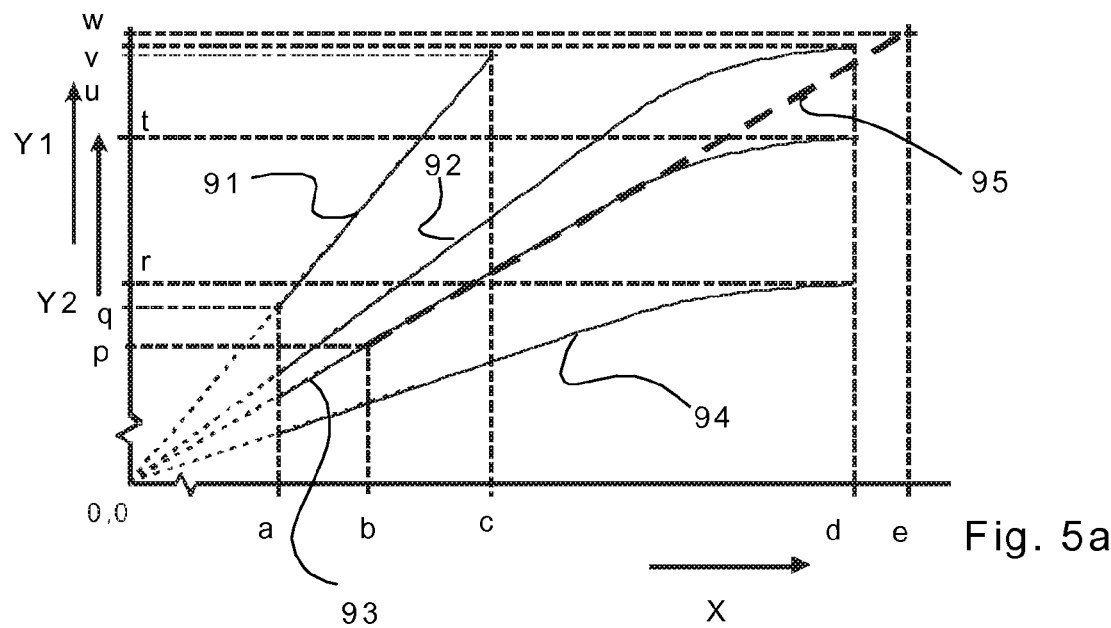

FIG. 5a shows how the Coriolis sensor 95 can be used as a calibration means for the thermal flow sensor. The Coriolis sensor 95 has a specific sensitivity, with a mass flow range from b to a. This can be used for calibrating the thermal flow sensor. This can be done by scaling the output signal at an unchanged mass flow. The inclination of the thermal flow sensor can thus be calibrated such that its sensitivity at a specific mass flow of the medium corresponds to the sensitivity of the Coriolis sensor. The signal 93 has the same sensitivity as the Coriolis sensor in that case. The signals 91, 93 are too sensitive; the signal 94 is too insensitive.

Figure 5B:
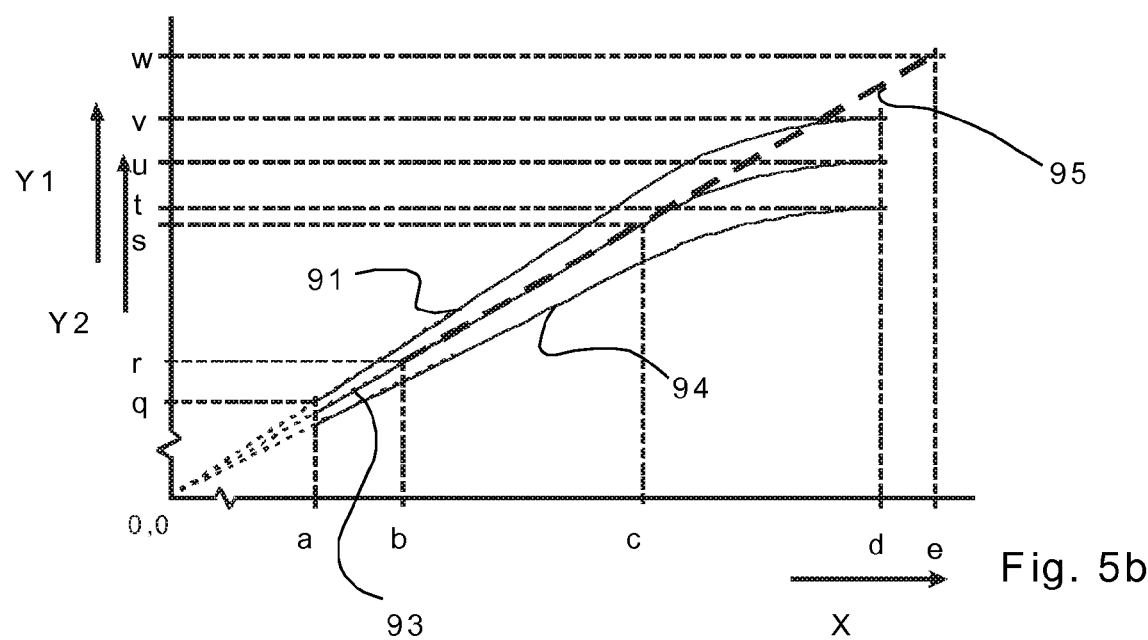

FIG. 5b shows how the signal from the thermal flow sensor can be adjusted by amplification for the purpose of adjusting the sensitivity of the thermal flow sensor. At a specific mass flow, the sensitivity of the two sensors is equalised by selecting the correct amplification of the thermal flow sensor. In this way a flow meter having a relatively large dynamic range (a to e) can be obtained. The ranges of the two sensors partially overlap.

Figure 5C:
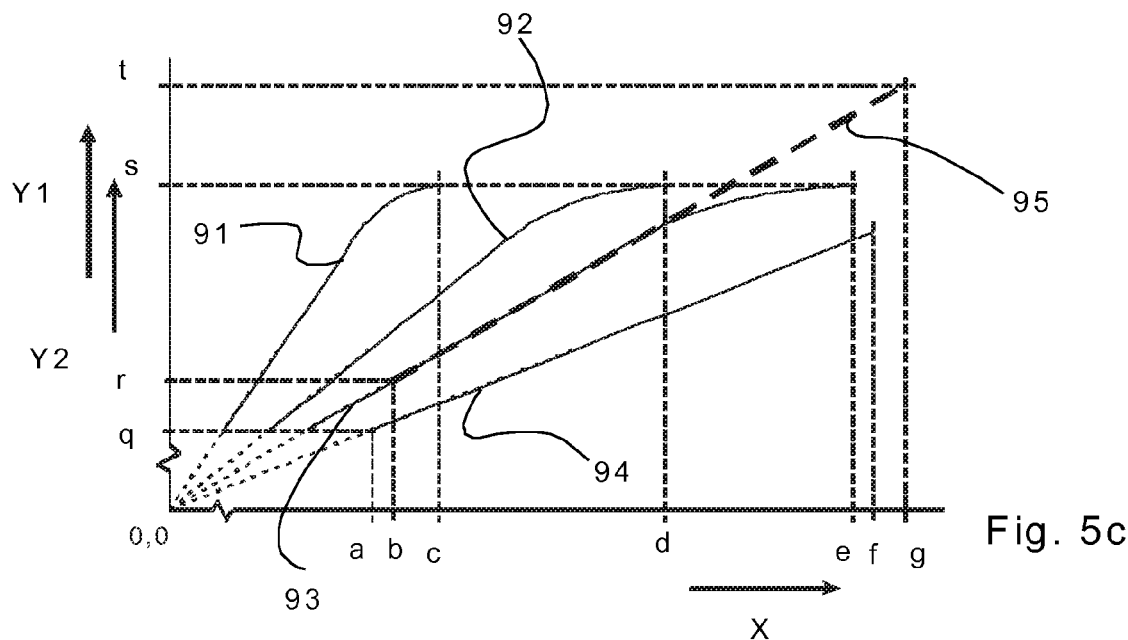

FIG. 5c shows how shunts as described with reference to FIG. 4c can be used. FIG. 5c shows the output signal from a combination of a Coriolis sensor 95 and a thermal flow sensor 91, 92, 93, 94. The signal 91 shows a thermal flow sensor without a shunt. Shunts make it possible to increase the measuring range at the expense of the sensitivity of the thermal flow sensor. The lower range of the thermal flow sensor scales along the mass flow axis X, but not along the output signal axis Y2.

Figure 5D:
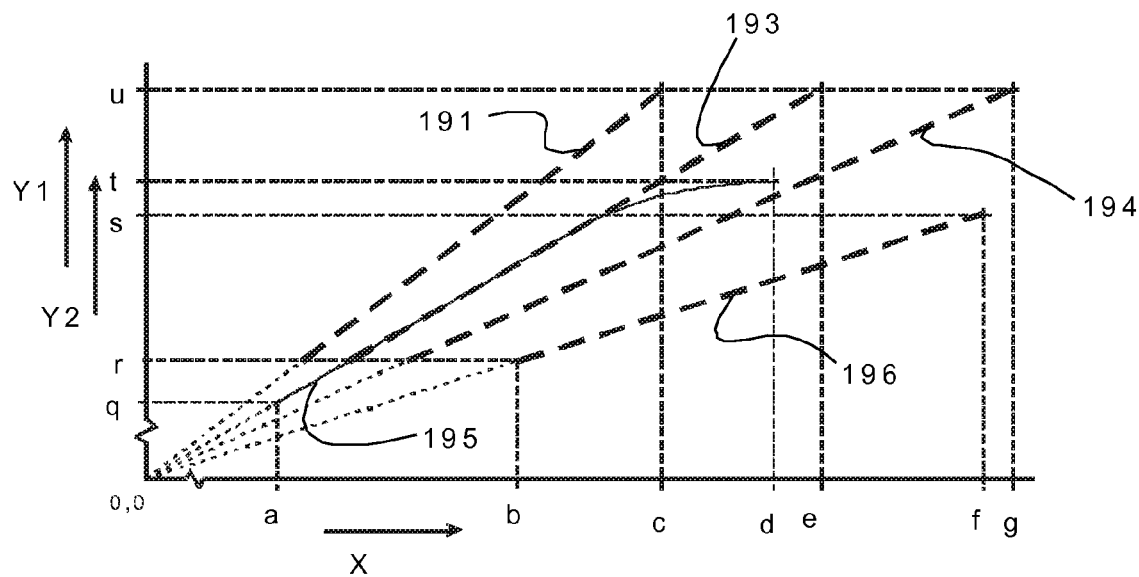

FIG. 5d shows how shunts as described above with reference to FIG. 4d can be used. FIG. 5d shows the output signal from a combination of a Coriolis sensor 91, 93, 94, 95 (with or without shunts) and a thermal flow sensor 92. The signal 91 shows the Coriolis sensor without a shunt. When shunts are used, the measurable range will increase, but the sensitivity will decrease. The lower limit of the measuring range will also increase if more shunts are used, however.

Finally, FIG. 6, shows a schematic top view of an embodiment of the system chip comprising a monocrystalline silicon substrate 14 provided with two openings 51, 52 that have been etched therein. The monolithic system chip 16 is combined into one unit with two permanent magnets 1031, 1032 disposed opposite each other, which are mounted on a carrier (not shown), as already described with reference to FIG. 1. Provided in and on the system chip is a flow tube 1021, 1022, 1023 for transporting a medium whose flow is to be measured. This flow tube 1021, 1022, 1023 comprises a first end 1004 in the form of a supply end 1004 and a second end 1006 in the form of a discharge end 1006 disposed downstream of the supply end. The flow tube is provided with a first flow sensor 1011 and a second flow sensor 1012, both in the form of a Coriolis flow sensor. With the Coriolis flow sensors, the flow through the flow tube 1021, 1022 may be measured at a first and a second position.

The first Coriolis flow sensor 1011 is positioned opposite to the second Coriolis flow sensor 1012, such that between the first Coriolis flow sensor 1011 and the second Coriolis flow sensor, a mirror line is formed.

In the embodiment shown, the flow sensors are positioned in parallel. It is thinkable, however, that at the position of the tube 1013 connecting the first Coriolis sensor 1011 to the second Coriolis sensor 1012, a further connection point is present, which forms an opening for supplying or discharging the medium. Preferably, this point is used as a supply opening. The medium will leave the system chip via the supply end 1004 (which then is used as a discharge opening), en via the discharge end 1006. This enables a parallel arrangement of the two Coriolis flow sensors.

In a serial arrangement it is possible to measure differentially with the two Coriolis sensors, such that local disturbances on the measurement signal can be filtered out. In addition, it is possible to measure a signal that is twice as high, by adding the individual signals of the Coriolis sensors.

In a parallel arrangement, it is possible to let only a part of the flow pass through the first Coriolis sensor, and to let another part of the flow pass through the second Coriolis sensor. The Coriolis sensors may have the same dimensions, but they can also differ from each other, and be suitable for measurement in different flow ranges. With this, it is possible to measure in a first flow range with the first Coriolis sensor, and to measure in a second flow range with the second Coriolis sensor, wherein the second flow range at least partially differs from the first flow range.

In the embodiment shown, the system chip again comprises an absolute pressure sensor 1018, such as a Pirani pressure sensor 1018, to be used for correcting the measured vibration of the Coriolis tube 21 for the air pressure.

Those skilled in the art will appreciate that the present invention has been described in the foregoing on the basis of a few embodiments that are preferred. The invention is not limited to these embodiments, however.

Thus, the invention has been explained mainly on the basis of an embodiment in which use is made of a system chip. It is also possible, however, to use the invention in other (larger) flow meters.

Equivalent variations and/or variations which may or may not be obvious to the skilled person are conceivable within the framework of the invention. Said variations may fall within the scope as defined in the appended claims.

The invention claimed is:

1. A flow meter for determining a flow of a medium, comprising:
a flow tube for transporting the medium whose flow is to be measured, the flow tube has a first end and a second end disposed at a distance from the first end;
a first flow sensor for measuring the flow of the medium at a first position of the flow tube, the first flow sensor being a Coriolis flow sensor or a thermal flow sensor;
a second flow sensor for measuring the flow of the medium at a second position of the flow tube spaced from the first position, the second flow sensor being a thermal flow sensor, wherein
the flow meter comprises a system chip which is provided with the flow tube.

2. The flow meter according claim 1, wherein the flow meter comprises a calibrator configured for calibrating the first flow sensor on the basis of at least a signal delivered by the second flow sensor.

3. The flow meter according to claim 1, wherein the first flow sensor is designed for measuring the flow within a first measuring range, and the second flow sensor is designed for measuring the flow within a second measuring range.

4. The flow meter according to claim 3, wherein the first measuring range and the second measuring range overlap.

5. The flow meter according to claim 4, wherein the first measuring range and the second measuring range overlap only partially.

6. The flow meter according claim 1, wherein both the first flow sensor and the second flow sensor are thermal flow sensors.

7. A flow meter for determining a flow of a medium, comprising:
a flow tube for transporting the medium whose flow is to be measured, the flow tube has a first end and a second end disposed at a distance from the first end;
a first flow sensor for measuring the flow of the medium at a first position of the flow tube, the first flow sensor being a first thermal flow sensor;
a second flow sensor for measuring the flow of the medium at a second position of the flow tube, the second flow sensor being a second thermal flow sensor;
wherein the first thermal flow sensor is provided with:
a first sensor circuit, comprising a first resistor element, which is temperature-sensitive and which is thermally connected to the flow tube, and a second resistor element that can be electrically connected in series therewith;
a first voltage measuring element which is electrically connectable between the first and the second resistor element;
a first heater for heating the flow tube at least partially at the location of the first resistor element;
and wherein the second thermal flow sensor is provided with:
a second sensor circuit, comprising a third resistor element which is temperature-sensitive and which is thermally connected to the flow tube, and a fourth resistor element that can be electrically connected in series therewith;
a second voltage measuring element which is electrically connectable between the third and the fourth resistor element;
a second heater for heating the flow tube at least partially at the location of the third resistor element;
wherein the first sensor circuit is electrically connected to the second sensor circuit in such a manner that said first sensor circuit and said second sensor circuit form a first half and a second half, respectively, of a Wheatstone bridge.

8. The flow meter according to claim 7, wherein the flow meter is provided with a switch adapted for selectively forming the first half of the Wheatstone bridge from two of the resistor elements and selectively forming the second half of the Wheatstone bridge from two of the remaining resistor elements.

9. The flow meter according to claim 7, wherein at least one of the second resistor element or the fourth resistor element is temperature-sensitive.

10. The flow meter according claim 7, wherein at least one of the second resistor element or the fourth resistor element are thermally connected to the flow tube.

11. The flow meter according claim 7, wherein the first and the second resistor element are connected to a first part of the flow tube, and the third and the fourth resistor element are connected to a second part of the flow tube, which first and second parts are essentially spaced from each other.

12. The flow meter according to claim 11, wherein said first part and said second part are disposed opposite each other, extending parallel to each other.

13. The flow meter according to claim 7, wherein the first heater comprises at least the first or the second resistor element, or wherein the second heater comprises at least the third or the fourth resistor element.

14. A method for determining a flow of a medium, by means of a flow meter according to claim 1, said method comprising the steps of:
A) providing a flow tube;
B) transporting a medium whose flow through the flow tube is to be determined;
C) measuring the flow of the medium at a first position of the flow tube;
D) determining the flow of the medium on the basis of one or more obtained measuring data; and
E) measuring the flow of the medium at a second position of the flow tube.

15. The method according to claim 14, wherein the second position is different from the first position.

16. The method according to claim 14, wherein step E is carried out simultaneously with step C.

17. The method according to claim 14, wherein in step C the flow within a first measuring range is measured and wherein in step E the flow within a second measuring range is measured.

18. The method according to claim 17, wherein the first measuring range and the second measuring range overlap.

19. The method according to claim 18, wherein the first measuring range and the second measuring range overlap only partially.

20. The method according to claim 14, wherein step C is carried out with a first flow sensor, and wherein the method comprises the further step of at least one of collecting or calibrating the first flow sensor on the basis of one or more measuring data obtained in step E.

21. The method according to claim 14, wherein the first flow sensor is a thermal flow sensor.

22. The flow meter according to claim 1, wherein the first flow sensor is a first thermal flow sensor, and the first thermal flow sensor is provided with:
- a first sensor circuit, comprising a first resistor element, which is temperature-sensitive and which is thermally connected to the flow tube, and a second resistor element that can be electrically connected in series therewith;
- a first voltage measuring element which is electrically connectable between the first and the second resistor element;
- a first heater for heating the flow tube at least partially at the location of the first resistor element;

and wherein the second thermal flow sensor is provided with;
- a second sensor circuit, comprising a third resistor element which is temperature-sensitive and which is thermally connected to the flow tube, and a fourth resistor element that can be electrically connected in series therewith;
- a second voltage measuring element which is electrically connectable between the third and the fourth resistor element;
- a second heater for heating the flow tube at least partially at the location of the third resistor element; wherein the first sensor circuit is electrically connected to the second sensor circuit in such a manner that said first sensor circuit and said second sensor circuit form a first half and a second half, respectively, of a Wheatstone bridge.

23. The flow meter according to claim 22, wherein the flow meter is provided with a switch adapted for selectively forming the first half of the Wheatstone bridge from two of the resistor elements and selectively forming the second half of the Wheatstone bridge from two of the remaining resistor elements.

24. The flow meter according to claim 22, wherein at least one of the second resistor element or the fourth resistor element is temperature-sensitive.

25. The flow meter according claim 22, wherein at least one of the second resistor element or the fourth resistor element are thermally connected to the flow tube.

26. The flow meter according claim 22, wherein the first and the second resistor element are connected to a first part of the flow tube, and the third and the fourth resistor element are connected to a second part of the flow tube, which first and second parts are essentially spaced from each other.

27. The flow meter according to claim 21, wherein said first part and said second part are disposed opposite each other, extending parallel to each other.

28. The flow meter according to claim 22, wherein the first heater comprises at least the first or the second resistor element, or wherein the second heater comprises at least the third or the fourth resistor element.

* * * * *

UNITED STATES PATENT AND TRADEMARK OFFICE
CERTIFICATE OF CORRECTION

PATENT NO. : 8,881,601 B2
APPLICATION NO. : 13/487465
DATED : November 11, 2014
INVENTOR(S) : Lammerink et al.

Page 1 of 1

It is certified that error appears in the above-identified patent and that said Letters Patent is hereby corrected as shown below:

In the Claims

Column 16, line 28, "claim 21" should be changed to --claim 26--.

Signed and Sealed this
Third Day of March, 2015

Michelle K. Lee
*Deputy Director of the United States Patent and Trademark Office*